United States Patent [19]

Hoppstock et al.

[11] 3,903,189

[45] Sept. 2, 1975

[54] OXIDATIVE DEHYDROGENATION OF OLEFINS TO DIOLEFINS

[75] Inventors: Frederic H. Hoppstock, Massillon; Kenneth J. Frech, Tallmadge, both of Ohio

[73] Assignee: The Goodyear Tire & Rubber Company, Akron, Ohio

[22] Filed: June 21, 1974

[21] Appl. No.: 481,595

[52] U.S. Cl. .................. 260/680 E; 260/669 R
[51] Int. Cl.² ............................................ C07C 5/18
[58] Field of Search ................... 260/680 E, 669 R

[56] References Cited
UNITED STATES PATENTS

| | | | |
|---|---|---|---|
| 2,326,258 | 8/1943 | Schmidt et al. | 260/680 E |
| 3,511,887 | 5/1970 | Bockrath et al. | 260/669 R |
| 3,763,257 | 10/1973 | Bradshaw et al. | 260/669 R |
| 3,801,670 | 4/1974 | Shiraishi et al. | 260/680 E |

*Primary Examiner*—Paul M. Coughlan, Jr.
*Attorney, Agent, or Firm*—F. W. Brunner; J. Y. Clowney

[57] ABSTRACT

Butene-1, butene-2, 2-methyl-1-butene, 2-methyl-2-butene, 3-methyl-1-butene, n-pentene, 2,3-dimethyl-1-butene, 2,3-dimethyl-2-butene, 2-methyl-1-pentene, 2-methyl-2-pentene, 4-methyl-2-pentene, 3-methyl-1-pentene, 3-methyl-2-pentene, 2-ethyl-1-butene, ethyl benzene and isopropyl benzene are oxidatively dehydrogenated while in the presence of a catalyst comprising zinc molybdate.

3 Claims, No Drawings

OXIDATIVE DEHYDROGENATION OF OLEFINS TO DIOLEFINS

This application is directed to a process of the oxidative dehydrogenation of hydrocarbons.

For instance, employing the process of this invention, butene-1 and/or butene-2 can be oxidatively dehydrogenated to butadiene, isoamylenes such as 2-methyl-1-butene, 2-methyl-2-butene and 3-methyl-1-butene to isoprene, n-pentenes to piperylene, 2,3-dimethyl-1-or 2-butenes to 2,3-dimethyl-1,3-butadiene, methyl pentenes such as 2-methyl-1-pentene, 2-methyl-2-pentene, 4-methyl-2-pentene, 3-methyl-1-pentene, 3-methyl-2-pentene and 2-ethyl-1-butene to methyl pentadienes, ethyl benzene to styrene and isopropyl benzene to α-methyl styrene.

The invention provides an oxidative dehydrogenation process which reduces or eliminates endothermic heat requirements, permits continuous burn-off of carbon from the catalyst, permits longer catalyst life, provides higher per pass conversions and higher yields or selectivity to the desired products. Thus, it is obvious that the process of this invention is somewhat more economical than those of the prior art.

According to the invention, hydrocarbons are oxidatively dehydrogenated by subjecting at least one hydrocarbon selected from the group consisting of butene-1, butene-2, 2-methyl-1-butene, 2-methyl-2-butene, 3-methyl-1-butene, n-pentene, 2,3-dimethyl-1-butene, 2,3-dimethyl-2-butene, 2-methyl-1-pentene, 2-methyl-2-pentene, 4-methyl-2-pentene, 3-methyl-1-pentene, 3-methyl-2-pentene, 2-ethyl-1-butene, ethyl benzene and isopropyl benzene to oxidative dehydrogenation conditions while the presence of a catalyst comprising zinc molybdate.

The oxidative dehydrogenation process of this invention can be conducted under fairly reasonable reaction conditions. For instance, the temperatures employed may vary from about 350°c to 650°C with 450°C to 600°C being more preferred.

In order to provide a better temperature control of the process, it is usually desirable to employ a diluent, but a diluent is not absolutely required. Materials such as steam, nitrogen, methane, hydrogen, carbon dioxide or other diluents known to be stable under the reaction conditions may be employed. When a diluent is employed, the diluent to hydrocarbon mole ratio may be from 1/1 to 20/1 with a more preferred range of 2/1 to 5/1.

While oxygen may be used as an oxidant, it is more economical and usually preferred to employ air as the oxidant. The oxidant mole ratio to the hdyrocarbon feed in terms of $O_2/HC$ should be between 0.1/1 and 10/1 with a more preferred range being 0.5/1 to 5/1.

The rate at which the hydrocarbon is passed through the reactor and is in contact with the catalyst is the Liquid Hour Space Velocity (LHSV) and is defined as the volume of hydrocarbon as a liquid passed over a given volume of catalyst per hour. the LHSV employed in this invention should range from about 0.1 to about 100 with a more preferred LHSV of 0.5 to 10 being employed.

One particularly interesting embodiment of this process is the preparation of 2,3-dimethyl-1,3-butadiene by the oxidative dehydrogenation of 2,3-dimethyl-2-butene and/or 2,3-dimethyl-1-butene, particularly mixtures where the 2-olefin is in the range of from about 65 to 80 mole percent.

The catalyst employed in this invention is zinc molybdate ($ZnMoO_4$). The catalyst can be used in either its pure from such as pulverized $ZnMoO_4$ or it can be employed as a physical mixture with or deposited on some support material normally employed in hydrocarbon conversion processes. Examples of such support materials are alumina, silica-alumina, silica, silicon carbide, pumice, and the like.

The catalyst may be impregnated on a normal catalytic support material known in the art, for instance, alumina, silica, silica-alumina, magnesia, clays, pumice, titania, zirconias and the like. When the catalyst is impregnated on a support, the amount of $ZnMoO_4$ should range from about 3 to 50 percent by weight, with about 10 to 30 percent being preferred.

On the other hand, the catalyst of this invention may be coprecipitated from solutions containing various salts of zinc and molybdenum and/or aluminum as hydroxides and the calcined to produce the catalyst impregnated on alumina.

Of course, it is usually conventional in a heterogeneous catalytic process such as that of this invention to employ continuous reaction systems with either fixed bed catalysts or fluidized bed catalysts. Therefore, it is usually preferred to employ the catalyst of this invention in a form which will not crush or be attrited easily. For that reason, it is usually more satisfactory to impregnate the catalyst from its salt onto a suitable rugged support in the form of pellets of fluidizable powder. It has been found in practice that the most suitable support is alumina. However, that is not to imply that other support materials such as silica, silica-alumina, magnesia, titania or zirconia are not acceptable or even crushed pumice and the like could be employed as the catalyst support.

The active catalyst itself, zinc molybdate ($ZnMoO_4$), at about 99.5 percent purity can be obtained commercially from The Ventron Corporation, Beverly, Mass, USA.

The catalyst may be treated with small amounts of a basic material such as potassium hydroxide or sodium hydroxide to moderate the acidic nature of the catalyst. This tends to prevent isomerization of the 2,3-dimethyl-2-butene to 2,3-dimethyl-1-butene and also prevents or retards the burning of the reactants and/or the products as such treatment lowers the amount of carbon dioxide in the effluent. It also prevents the degradation into lower hydrocarbons or lights of the reactants and/or products. About 0.1 to about 10 percent by weight of the base may be employed for this moderation, with about 0.5 to about 2 percent being more preferred.

The invention is further illustrated by reference to the following examples which are intended to be illustrative rather than restrictive of the scope.

EXAMPLE I

Into a reactor composed of a 0.43 inch internal diameter, 316 stainless steel tube, there was placed 6 cubic centimeters (cc) of zinc molybdate, prepared as described elsewhere in the specification. The reactor was heated in a tubular furnace and the temperature was controlled by means of thermocouples placed in various locations along the reactor. The hydrocarbon feed which was 2,3-dimethyl-2-butene and the water diluent were introduced as liquids using a syringe infusion pump. The air or oxygen and nitrogen were metered into the system. The reactor effluent was analyzed using gas chromatographic techniques.

The results are reported in the table below in which column 1 is the run number, column 2 is the water to hydrocarbon mole ratio used to make steam which was the diluent, column 3 is the oxygen to hydrocarbon mole ratio, although air was the actual oxidant used, column 4 is the conversion of the 2,3-dimethyl-2-butene in mole percent, column 5 is the yield of 2,3-dimethyl-1,3-butadiene in mole percent, column 6 is the selectivity to 2,3-dimethyl-1,3-butadiene in percent and column 7 is the weight percent of zinc molybdate ($ZnMoO_4$) deposited on the catalyst support.

In these runs, the catalyst employed was zinc molybdate ($ZnMoO_4$) on gamma alumina ($Al_2O_3$) treated with 0.36N potassium hydroxide (KOH) solution. The temperature was 500°C and the LHSV was 0.5.

TABLE 1

| 1 Run No | 2 $H_2O/HC$ M ratio | 3 $O_2/HC$ M ratio | 4 Conversion Mole % | 5 Yield Mole % | 6 Selectivity % | 7 $ZnMoO_4$ wt % |
|---|---|---|---|---|---|---|
| 1 | 3.1 | 1.2 | 23 | 14 | 61 | 6 |
| 2 | 2.6 | 1.1 | 26 | 16 | 61 | 11 |
| 3 | 2.9 | 1.2 | 37 | 27 | 72 | 20 |
| 4 | 2.9 | 1.2 | 47 | 38 | 81 | 37 |
| 5 | 3.5 | 1.4 | 73 | 55 | 75 | 100 |

EXAMPLE II

In these experiments which were conducted in the same manner as in Example I except that conditions were changed. The results and conditions are set forth below.

TABLE 2

| 1 Run No. | 2 $H_2O/HC$ M ratio | 3 $O_2/HC$ M ratio | 4 Conversion Mole % | 5 Yield Mole % | 6 Selectivity % | 7 $ZnMoO_4$ Wt % |
|---|---|---|---|---|---|---|
| 8 500°C | 2.6 | 1.1 $O_2$ | 26 | 16 | 61 | 11 |
| 9 550°C | 3.0 | 1.4 $O_2$ | 69 | 53 | 77 | 11 |

While certain representative embodiments and details have been shown for the purpose of illustrating the invention, it will be apparent to those skilled in this art that various changes and modifications may be made therein without departing from the spirit or scope of the invention.

What is claimed is:

1. The dehydrogenation method which consists of contacting a catalyst consisting of 3 to 50 percent by weight of zinc molybdate on a suitable support, which catalyst has been treated with from 0.1 to 10 percent by weight based on the weight of said catalyst with potassium hydroxide or sodium hydroxide, with at least one hydrocarbon selected from the group consisting of butene-1, butene-2, 2-methyl-1-butene, 2-methyl-2-butene, 3-methyl-1-butene, n-pentene, 2,3-dimethyl-1-butene, 2,3-dimethyl-2-butene, 2-methyl-1-pentene, 2-methyl-2-pentene, 4-methyl-2-pentene, 3-methyl-1-pentene, 3-methyl-2-pentene, 2-ethyl-1-butene, ethylbenzene and isopropylbenzene, at a temperature ranging from about 350°C to about 650°C, at an LHSV ranging from about 0.1 to about 100, while in the presence of an oxidant selected from the group consisting of air and oxygen in an amount ranging from about 0.1 to about 10 moles of contained oxygen per mole of hydrocarbon feed and steam as a diluent in an amount ranging from about 1 to about 20 moles of steam per mole of hydrocarbon feed.

2. The method according to claim 1 in which a mixture of 2,3-dimethyl-1-butene and 2,3-dimethyl-2-butene is employed in which about 65 to about 80 mole percent of the mixture comprises 2,3-dimethyl-2-butene.

3. The method according to claim 2 in which air is employed as the oxidant in amounts to provide an oxygen/hydrocarbon mole ratio of 0.5/1 to 5/1 and in which the zinc molybdate is impregnated on an alumina support in amounts ranging from about 10 to about 30 percent by weight of the alumina and in which water is employed as a diluent in amounts of 2/1 to 5/1 mole ratio of diluent/hydrocarbon.

* * * * *